United States Patent
Dayka et al.

(10) Patent No.: US 9,122,864 B2
(45) Date of Patent: Sep. 1, 2015

(54) METHOD AND APPARATUS FOR TRANSITIVE PROGRAM VERIFICATION

(75) Inventors: John C. Dayka, New Paltz, NY (US); Walter Barlett Farrell, Woodstock, NY (US); Richard Henry Guski, Red Hook, NY (US); James W. Sweeny, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2079 days.

(21) Appl. No.: 12/186,198

(22) Filed: Aug. 5, 2008

(65) Prior Publication Data

US 2010/0037065 A1 Feb. 11, 2010

(51) Int. Cl.
*G06F 11/30* (2006.01)
*G06F 12/14* (2006.01)
*G06F 21/44* (2013.01)
*G06F 21/57* (2013.01)

(52) U.S. Cl.
CPC .............. *G06F 21/445* (2013.01); *G06F 21/57* (2013.01)

(58) Field of Classification Search
CPC ......... G06F 21/57; G06F 21/51; G06F 21/52; H04L 63/123; H04L 63/102
USPC ........................................................ 713/187
See application file for complete search history.

(56) References Cited

U.S. PATENT DOCUMENTS

| 5,692,047 | A | 11/1997 | McManis |
| 6,907,522 | B2 | 6/2005 | Morais et al. |
| 2003/0135746 | A1 | 7/2003 | Abbott et al. |
| 2005/0033978 | A1 | 2/2005 | Hyser |
| 2005/0132217 | A1 | 6/2005 | Srinivasan et al. |
| 2005/0198517 | A1 | 9/2005 | Ivanov et al. |
| 2006/0101408 | A1* | 5/2006 | Kotamarthi et al. .......... 717/126 |
| 2007/0016785 | A1* | 1/2007 | Guay et al. .................... 713/176 |
| 2007/0136416 | A1* | 6/2007 | Taylor ........................... 709/203 |
| 2007/0249416 | A1 | 10/2007 | Gazdic et al. |

FOREIGN PATENT DOCUMENTS

JP 09282155 A 10/1997

OTHER PUBLICATIONS

"Trust[ed | in] Computing, Signed Code and the Heat Death of the Internet," Poritz, Symposium on Applied Computing Archive Proceedings of the 2006 ACM Symposium on Applied Computing, Apr. 23-26, 2006, Dijon, France, pp. 1855-1859.

* cited by examiner

*Primary Examiner* — Kambiz Zand
*Assistant Examiner* — Stephen Sanders
(74) *Attorney, Agent, or Firm* — William A. Kinnaman, Jr.

(57) ABSTRACT

A method, apparatus and program storage device for program verification in an information handling system in which an application program runs on an operating system having a signature verification function for verifying a digital signature of the application program. Upon loading of the application program, the signature verification function of the operating system verifies the digital signature of the application program and, if the digital signature is verified, initiates execution of the application program. Upon initiation of execution of the application program, a verification testing function associated with the application program tests the signature verification function of the operating system by presenting to it a sequence of test digital signatures in a specified pattern of true and false signatures. If its test of the signature verification function of the operating system is successful, the application program initiates normal execution. Otherwise, the application program terminates without initiating normal execution.

20 Claims, 6 Drawing Sheets

METHOD AND APPARATUS FOR TRANSITIVE PROGRAM VERIFICATION

BACKGROUND OF THE INVENTION

1. Field of the Invention

This invention relates to a method and apparatus for verifying the code integrity of a computer program during the loading and execution of the program.

2. Description of the Related Art

Computer programs that process information of a sensitive nature such as personally identifying information, credit card details, military data, and the like must be trusted to process the information as intended by the program designer. Since all computer programs consist of, at a low level, a collection of data bits, they are subject to modification by various means just as are any other collections of data. Present in the art today are various means to protect data, including computer programs, from unauthorized modification. Examples of such means include access control facilities and data encryption techniques.

One data encryption technique that is considered useful in this field is program signature and verification. In this process, the computer program is digitally 'signed' by: (1) computing a cryptographically secure 'hash' of the program as raw data (i.e., considered as a bit sequence), then (2) encrypting the hash result with the 'private key' of a pair of related so-called 'public key' encryption keys. This resulting digital 'signature' of the program is stored with the program. Later, when the program is to be verified, another hash of the program is generated. The signature that was stored with the program is decrypted to obtain the original hash value. If this matches the later hash, the program is proven for all practical purposes to be identical to when it was originally signed, since the probability of an arbitrarily altered program yielding the same cryptographic hash is on the order of $2^{-n}$, where n is the bit length of the hash.

Since a sensitive application program could be modified after signature verification but before execution, its integrity should be verified as close as possible to the time when the program is actually executed. Ideally, integrity verification should be conducted as part of the operating system process for loading programs into main memory. It follows that at the current state of the art, the integrity of a sensitive application program is intertwined with the integrity of the host operating system process by which the program is loaded into main memory and given hardware control for execution. General-purpose computer operating systems can be highly complex, consisting of many millions of lines of computer code that can execute in hardware privileged state. Verifying the integrity of such systems is a daunting problem that compounds the ability to trust the processing of the sensitive application programs and data that such systems host.

BRIEF SUMMARY OF THE INVENTION

Our invention features an approach to establishing a basis for trust in the integrity of a sensitive computer application program that involves—and verifies the correct operation of—not only the sensitive application program itself but also the signature verification function of the host operating system. This is accomplished by a purposeful interaction between the sensitive application program and relevant host operating system functions so that mutual verification occurs in a trustworthy manner.

More particularly, the present invention contemplates a method, apparatus and program storage device for program verification in an information handling system in which an application program runs on an operating system having a program verification function for verifying the application program. In accordance with the invention, the program verification function of the operating system verifies the application program and, responsive to verification of the application program, initiates execution of the application program, while a verification testing function of the application program, responsive to initiation of execution of the application program, tests the program verification function of the operating system.

Preferably, the application program initiates normal execution in response to a successful test of the program verification function of the operating system and terminates execution in response to an unsuccessful test of the program verification function of the operating system.

Preferably, the program verification function comprises a signature verification function for verifying a digital signature of the application program, and the application program, responsive to initiation of execution thereof, tests the signature verification function of the operating system. More particularly, such application program tests the signature verification function of the operating system by presenting to the signature verification function a plurality of test digital signatures in a specified pattern of true and false signatures for verification.

While the invention is not limited to any particular embodiment, the invention is preferably implemented as one or more software programs running on a general-purpose computer. As is well-known in the art, such software programs are realized as one or more program storage devices readable by a machine, tangibly embodying a program of instructions executable by the machine to perform a specified method. Further, such software programs, when combined with the general-purpose computer, form an apparatus that is programmed to perform the steps of the invention, with the program portions, in combination with the computer hardware, constituting the corresponding means for performing the specified method steps.

DETAILED DESCRIPTION OF THE INVENTION

Figure 1:
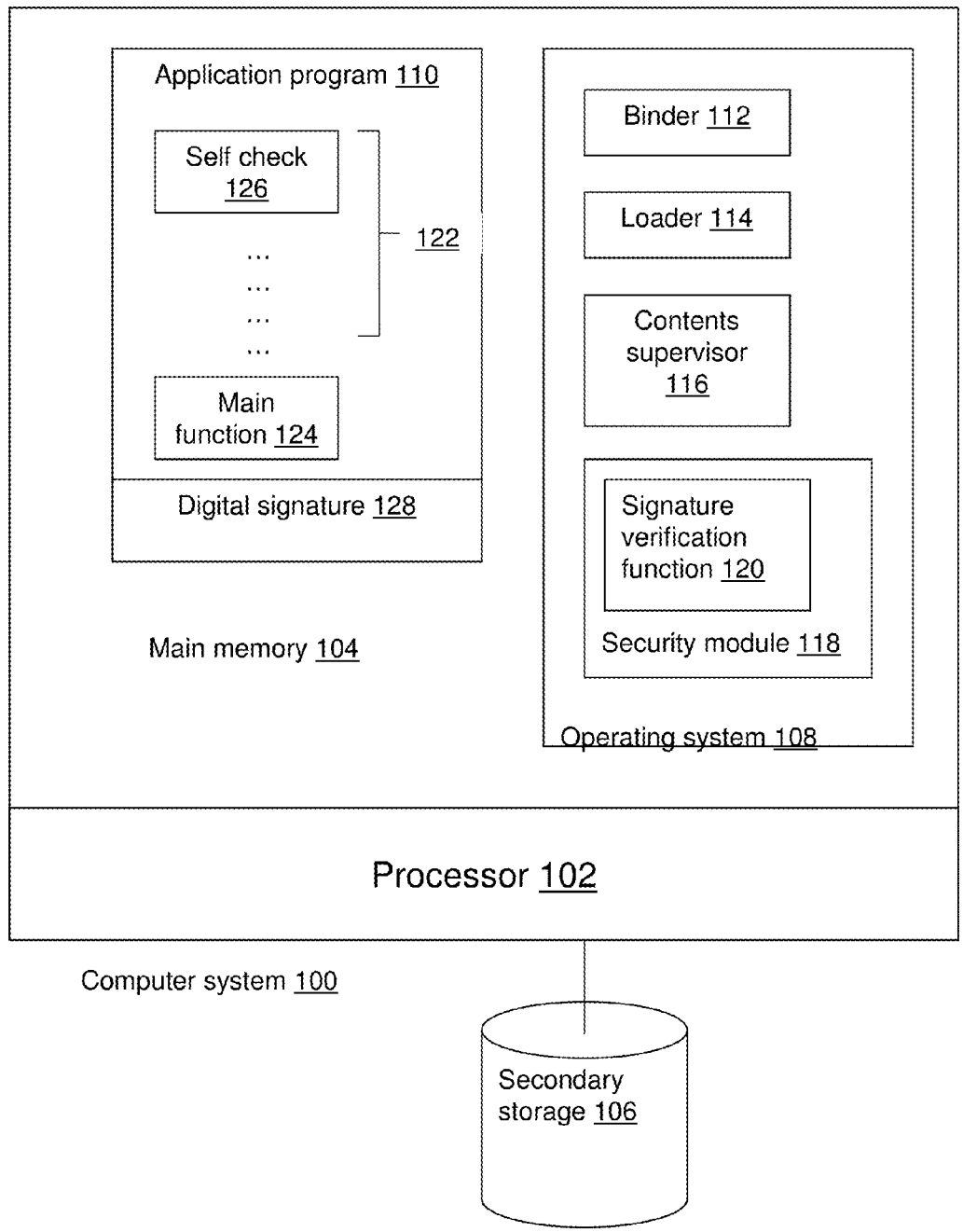
FIGS. 1 and 2 are schematic block diagrams of a computer system in which the present invention may be used.
Figure 2:
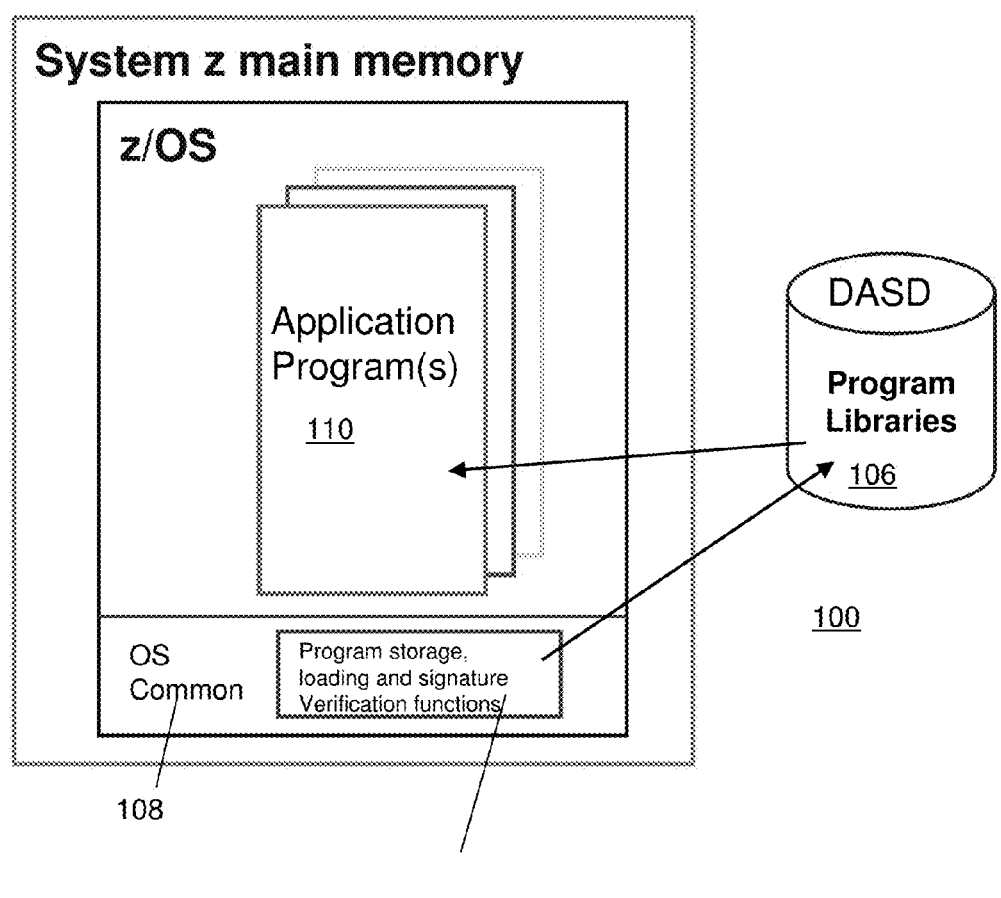

FIGS. 1 and 2 are schematic block diagrams showing different degrees of detail of a computer system 100 in which the present invention may be used. Computer system 100 includes such standard hardware elements as one or more central processing units (CPUs) 102, main memory 104 and secondary storage 106, in particular, a direct access storage device (DASD) such as a hard disk drive. Computer system 100 also contains such standard software components as an operating system 108 and one or more application programs 110 (which may be assumed to be 'sensitive' for the purposes of this discussion), as well as an input/output (I/O) subsystem (not separately shown) for connecting computer system 100 to various peripheral devices such as secondary storage 106. Operating system 108 manages the use of various system resources by application programs 110 and performs various services for the application programs, as is well known in the art. As is further well known in the art, operating system 108 and application programs 110 permanently reside in secondary storage 106, but are loaded into main memory 104 as a preliminary to execution by CPU(s) 102. Although the present invention is not limited to any particular hardware-software platform, in the embodiment shown, computer system 100 comprises an IBM System z server, while operating system 108 comprises the IBM z/OS operating system. (System z and z/OS are trademarks of IBM Corporation.)

Operating system 108 contains several components of particular relevance to the present invention, including a binder 112, a loader 114, a contents supervisor 116 and a security module 118 including a signature verification function 120.

Binder 112 joins together (or 'links') an application program's component(s) into a single executable entity—generally referred to as a 'load module'—that consists of one or more associated strings of binary data. The program signing process is applied against these data strings in a specific order and according to a specific protocol to produce the digital signature. The data strings and the signature are packaged together to form an executable load module, which along with other support documents and executables constitutes the program product that is shipped to end users.

Loader 114 prepares an application program 110 for execution in various ways, such as to resolve relocation address constants within the program so that it can be executed within any available set of virtual storage pages.

Contents supervisor 116 manages the contents of main memory 104, for example by loading programs into virtual storage for execution.

Security module 118 performs various access control and other security functions for operating system 108, and includes the signature verification function described 120. Although the present invention is not limited to any particular security module 118, an exemplary security module is the IBM Resource Access Control Facility (RACF), an element of the security server component of z/OS. (RACF is a trademark of IBM Corporation.)

Signature verification function 120 verifies the digital signature of a target program in the manner described above—namely, by generating another hash of the program using the same hash algorithm as before, decrypting the signature that was stored with the program (using the public key corresponding to the private key used to generate the signature) to obtain the original hash value, and comparing the two hash values to see if they are the same.

Likewise, application program 110 contains one or more integrity testing functions 122 in addition to normal program functionality 124 for a particular end user or middleware application. These integrity testing functions 122 may include, for example, one or more self-checking functions 126 for testing the integrity of the program 110. The particular program functionality 124 is relevant to the present invention only in the sense that the present invention is required to raise its level of trust to the level required. Therefore the purpose, function, and details of such functionality 124 are not presented herein.

Appended to application program 110 so as to be associated with it, but not actually part of the program, is a digital signature 128, generated in the manner described herein on the program proper (i.e., the program elements other than the signature itself). Preferably, application program 110 is 'signed' by the manufacturer of the program via use of the binder 112, presumably at a point in manufacture when the program has been tested for proper and trustworthy operation. Verification of the signature 128 of such a 'signed' program 110 can prove (in the probabilistic sense described above) that the program has not been changed since being signed.

When the application program 110 is installed (e.g., by the end user) onto the operating system 108, the installer may configure the security module 118 to interoperate with the contents supervisor 116 to activate and control the operation of the signature verification function 120 with respect to the particular application program that is being installed.

Later, when the application program 110 is invoked for execution under control of the operating system 108, the program is copied into 'pages' of virtual storage that are backed up by hardware main memory 104, under control of the contents supervisor 116. This is accomplished by the invocation, by the contents supervisor 116, of the loader 114.

As part of the initialization of the loading process, the contents supervisor 116 polls the security module 118 for possible security-relevant configuration information about the program 110 that is being loaded. The security module 118 thus informs the loader 114, via configuration 'directive' information that is passed by the security module 118 to the contents supervisor 116 and then by the contents supervisor 116 on to the loader 114, that this particular program 110 is subject to program signature verification. The loader 114 then reads the program 110 and passes the program content binary strings to the signature verification function 120 in the same order and according to the same protocol as was done earlier by the binder 112 as part of the manufacturing process. The 'directive' may allow for flexibility in handling various resulting situations. Examples include combinations of when the program signature verification is successful or when it is not with other real-time variables, in accordance with specific directions imposed by the end user.

The program binding, loading, signature generation, and verification functions described herein are well-known in the art; the particular manner in which they are performed forms no part of the present invention. They are provided as background in order to clarify the presentation of the preferred implementation.

Once the application program 110 has been loaded, and is passed control by the operating system 108, the application program, before it begins sensitive processing against sensitive data, can at its own option, perform the various integrity testing functions 122, including self-checking functions 126 that verify the correct operation and trustworthiness of the program itself. This process of performing self-checking is well-known within the art and does not as such form part of the present invention. The integrity of the integrity testing functions 126 themselves is assured because the code that constitutes these functions, which was designed and implemented by the program product manufacturer, has itself passed the program signature verification process—since it is part of the application program 110—thus proving that the integrity testing functions have not been altered since being signed by the manufacturer.

But what of the integrity of the loading processes themselves? Correct results from carefully designed integrity testing functions 122 within the loaded application program 110 can be the basis for concluding that the loading has been done properly. In other words, if it's running correctly, it must have been loaded correctly. But what of the signature verification process that the loader 114 relied on to verify the integrity of the sensitive application program 110? If this process can be compromised, then the sensitive application program 110, including the integrity testing functions within, can be compromised. This is the missing link in the integrity chain and is the object of the present invention.

In accordance with the present invention, the integrity testing functions that are included within the application program are augmented to include a verification testing function that tests the signature verification function of the operating system for proper and therefore trustworthy operation as it relates to the application program. The result can be viewed as a 'trust envelope' (discussed in more detail below) that includes the application program and the operating system functions that are relevant to its execution.

A central ideal of the present invention is that the operating system function that loads and verifies the code of a particular sensitive application program is itself tested for correct operation by code that is included within the sensitive application program.

In a preferred implementation of the present invention, it is used as a means to establish a high level of trust in certain highly sensitive application programs that are designed to run on computers under the control of the operating system.

Figure 3:
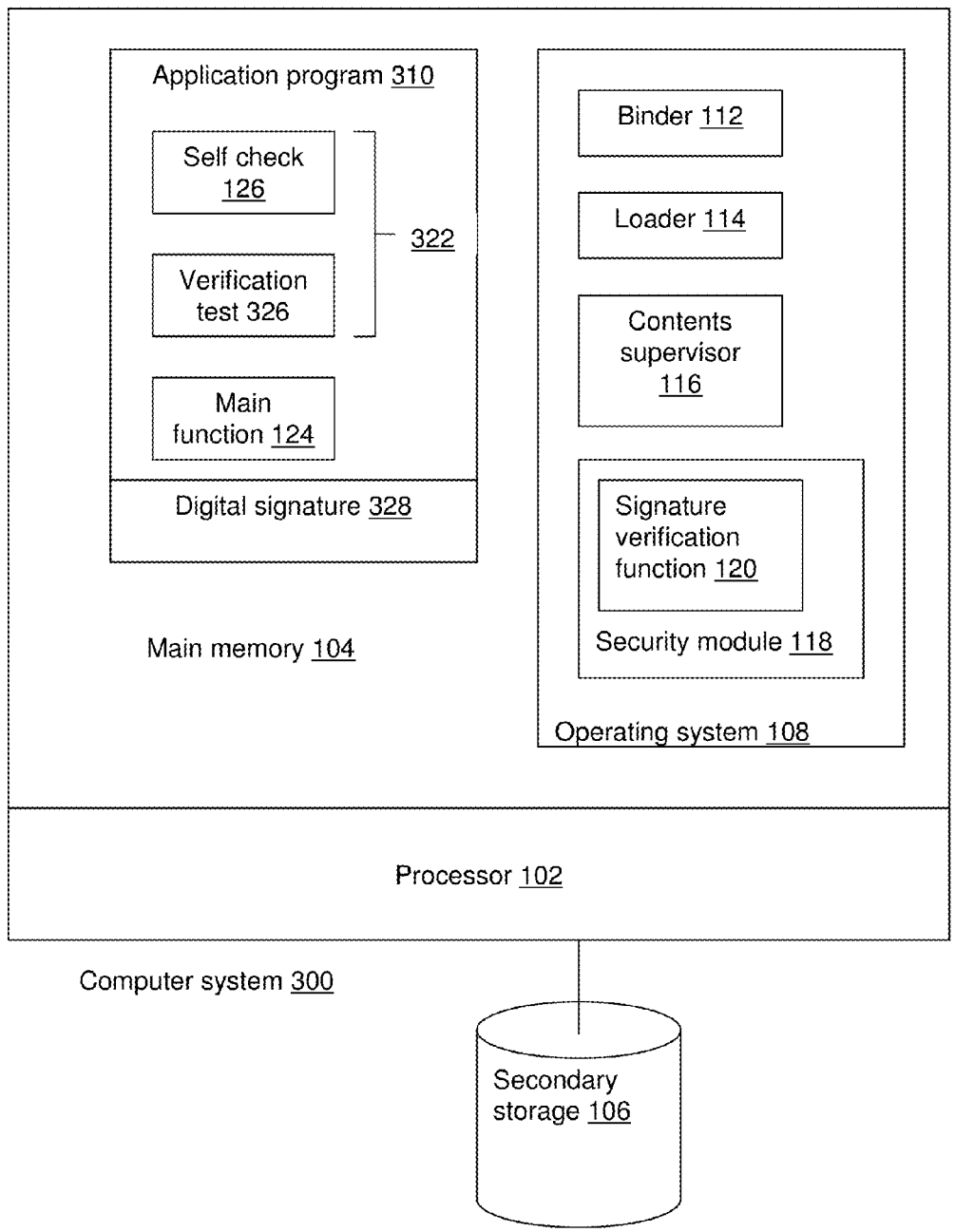
FIGS. 3 and 4 are schematic block diagrams of the computer system of FIGS. 1 and 2, modified to incorporate the present invention.
Figure 4:
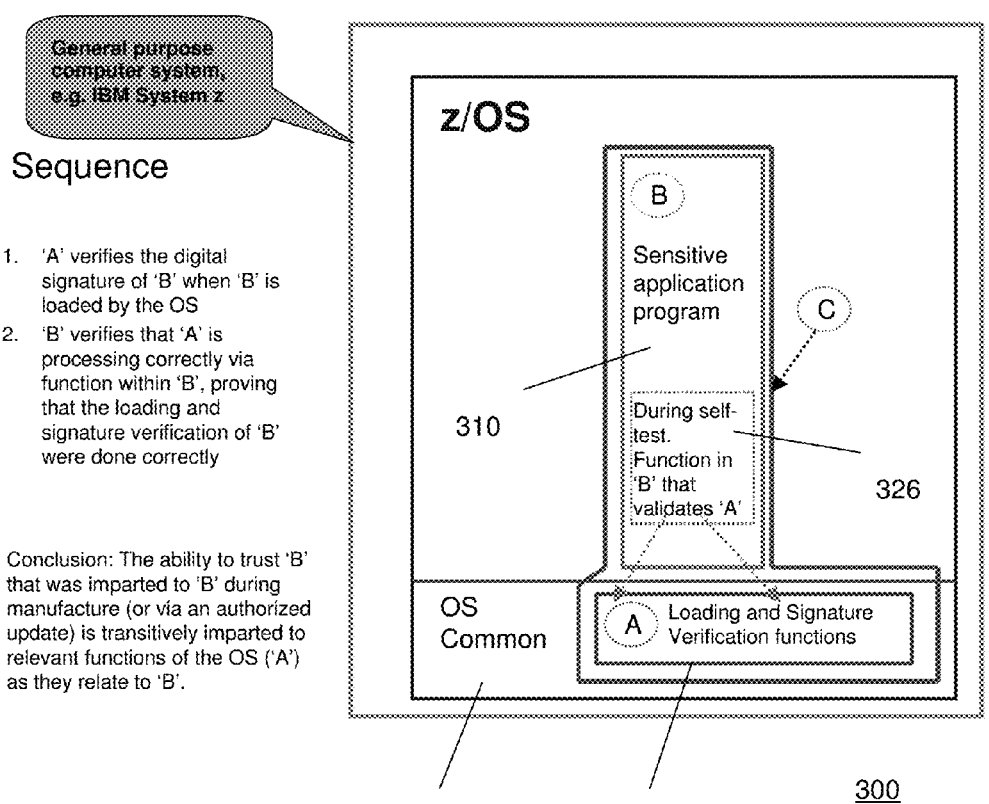

FIGS. 3 and 4 are schematic block diagrams of a computer system 300 that has been modified from the system 100 shown in FIG. 1 to incorporate the present invention. In FIGS. 3 and 4, elements that are identical to the corresponding elements in FIGS. 1 and 2 are given identical reference numbers, while new or modified elements are given new reference numbers; thus, elements 300, 310, 326 and 328 are new elements or modified versions of elements 100, 110, 126 and 128.

In accordance with the present invention, the integrity testing functions 322 of a modified application program 310 are augmented to include a verification testing function 326 for testing the integrity of the signature verification function 120 of the operating system 108. More particularly, after the application program 310 (which has already been loaded into virtual storage and had its code verified via the signature verification function 120) has checked itself for trustworthy operation using its self-checking function 122, it uses its verification testing function 326 to performs a function verification test of the signature verification function 120 of the operating system 108 to verify its correct operation. This real-time function verification test consists of, in a preferred implementation, a series of invocations of the operating system signature verification function 120. This sequence of invocations includes some data and signature combinations that should fail the signature verification and others that should succeed. Proper and expected results of this real-time function verification test sequence can indicate to the sensitive application program 110 that the signature verification function 120 within the operating system 108 is operating properly and therefore that the sensitive application program including its integrity verification functions are trustworthy.

In some ways, the program verification process of the present invention is analogous to certain well-known transitive relationships within mathematics, where if A has a 'transitive' relationship to B and B has the same transitive relationship to C, then A has that relationship to C; for example, if the transitive relationship is equality, "A=B, and B=C, therefore A=C". Hence the term transitive program verification, which is used herein to describe the present invention. Referring to FIG. 4, if we use 'A' to represent the loading and program signature verification functions 114 and 120 of the operating system 108, and 'B' to represent code within the sensitive application program 310, and 'C' to represent the execution environment of program 'B', then we can say that 'A' loads (and verifies) code within 'B' while 'B' tests for correct operation of 'A', therefore the system of 'A' and 'B' working together can be considered to be mutual components within a trust envelope 'C' formed by their interaction.

This 'trust envelope' concept can add to the integrity of sensitive application programs that run within a general-purpose operating system such as z/OS. The result is that program product consumers can have a higher level of trust in program products that perform functions against data that is of a sensitive nature, such as personally identifying information or data that has military significance.

Figure 5:
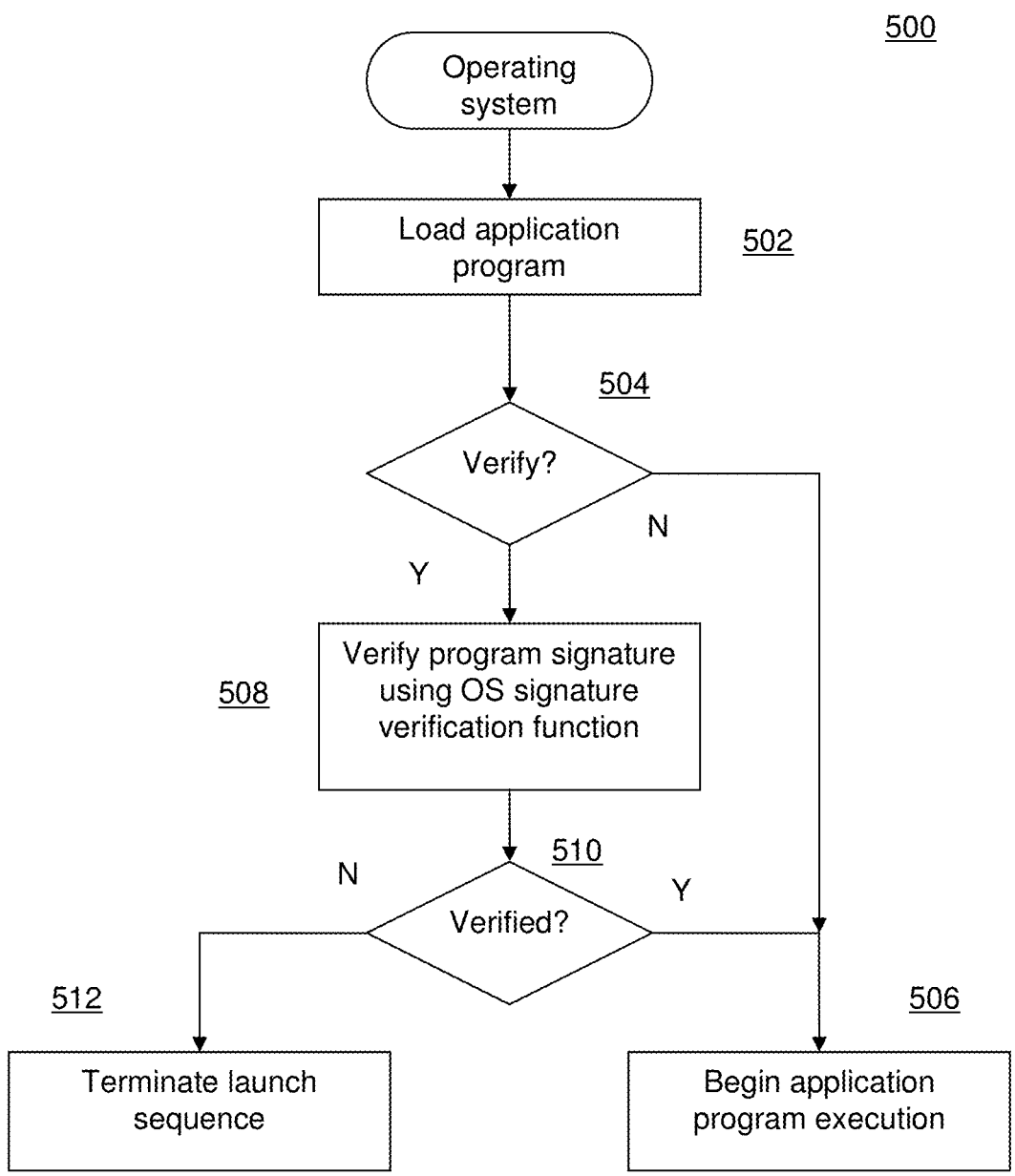
FIG. 5 is a flowchart of the steps performed by the operating system of the computer system shown in FIGS. 3 and 4 when launching an application program.

FIG. 5 shows the procedure 500 performed by the operating system 108 when launching the application program 310 shown in FIGS. 3 and 4.

The operating system 108 first loads the application program 310 from secondary storage 106 into main memory 104, using the loader 114 (step 502). The operating system 108 then determines whether application program 310 is a 'sensitive' program requiring verification (step 504). If not, then the operating system immediately initiates execution of the application program 110 (step 506). Otherwise, the operating system verifies the digital signature 328 of the application program 310, using the signature verification function 120 of the security module 118 (step 508). This is done in the manner described above—namely, by: (1) generating a comparison hash in the same manner as was used to generate the original hash for the signature; (1) decrypting the digital signature, using the public key corresponding to the private key used to generate the original signature, to regenerate the original hash; and (3) comparing the comparison hash with the original hash. If the two hashes match, then the digital signature is verified.

If the digital signature is verified—i.e., the two hashes match (step 510)—then the operating system 108 concludes that the application program 310 is genuine and has not been modified, and initiates execution of the application program (step 506). Otherwise, the operating system 108 terminates the launch sequence without initiating execution of the application program 310 (step 512).

Figure 6:
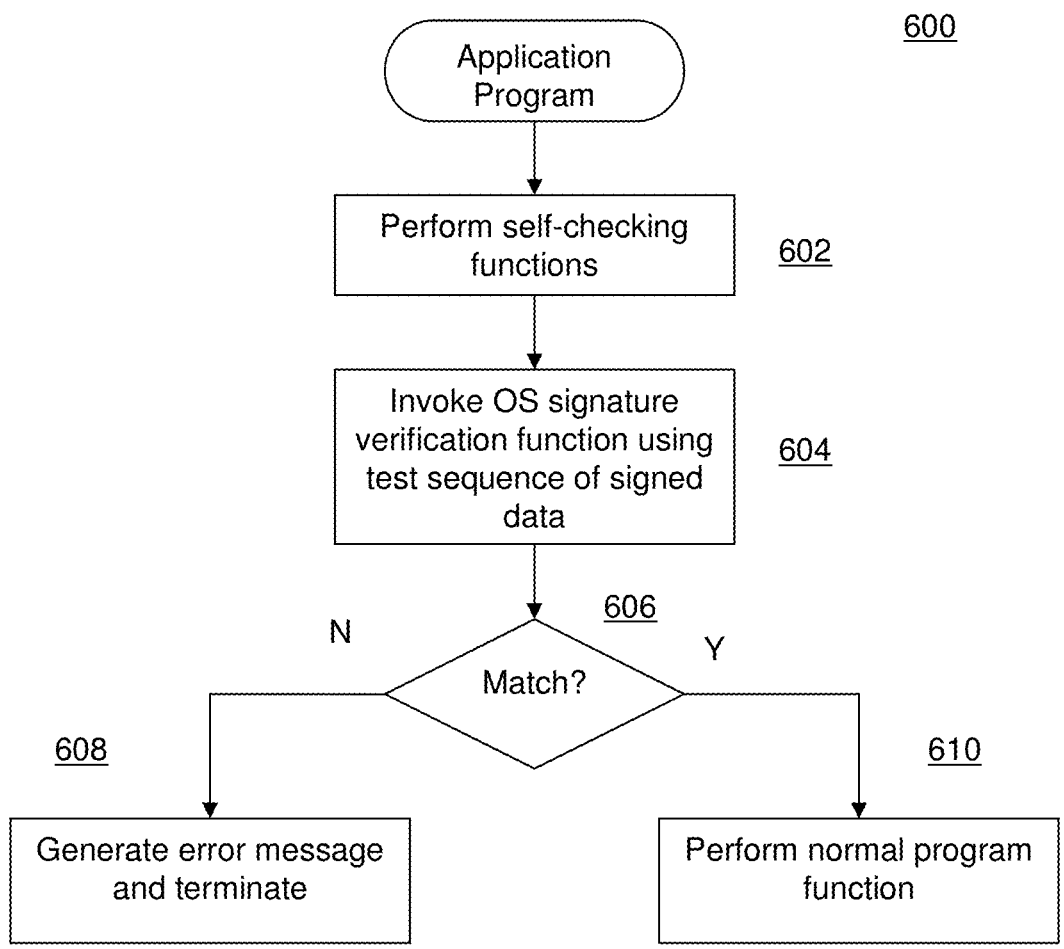
FIG. 6 is a flowchart of the steps performed by the application program of the computer system shown in FIGS. 3 and 4 upon initiation of its execution.

FIG. 6 shows the procedure 600 performed by the application program 310 shown in FIGS. 3 and 4 upon being launched by operating system 108. Upon being launched, the application program 310 first performs a series of self-tests using its self-checking function 126 (step 602). This step is no different from what is performed conventionally in the art and is therefore not further described.

Upon completing its self-tests, and in accordance with the present invention, the application program 310 tests the integrity of the signature verification function 120 of the operating system 108, using an integrity testing function 326 constructed for this purpose (step 604). Preferably, the application program 310 does this by a series of invocations of the signature verification function 120, some with genuine signatures and some with false signatures, in a sequence that cannot be predicted by the signature verification function. If the signature verification function 120 is operating properly, the signature verifications will succeed or fail in a pattern matching that of the test sequence. Otherwise, the patterns may diverge.

In any event, the signature verification function 120 of the operating system 108 generates a sequence of 'yes' or 'no' verification results that it reports back to the integrity testing function 326 of the application program 310. Upon receiving the reported test results, the application program 310 compares the generated pattern of test results with the actual pattern of true and false signatures to determine whether the two patterns match (step 606).

If the generated pattern of test results matches the actual pattern of true and false signatures, then the application program 310 concludes that the signature verification function 120 of the operating system 108 is working properly and initiates execution of the normal program function 124 (step 610). Otherwise, the application program 310 generates an error message and terminates execution (step 608).

While a particular embodiment has been shown and described, various modifications will be apparent to those skilled in the art.

What is claimed is:

1. In an information handling system in which an application program runs on an operating system having a signature verification function for verifying a digital signature of the application program, a method for program verification comprising the steps of:

having the signature verification function of the operating system verify the digital signature of the application program and, responsive to verification of the digital signature of the application program, initiate execution of the application program; and having the application program, responsive to initiation of execution thereof, test the signature verification function of the operating system by generating a test digital signature and presenting the test digital signature to the signature verification function for verification.

2. The method of claim 1 in which the application program initiates normal execution in response to a successful test of the signature verification function of the operating system.

3. The method of claim 1 in which the application program terminates execution in response to an unsuccessful test of the signature verification function of the operating system.

4. The method of claim 1 in which the application program tests the signature verification function of the operating system by presenting to the signature verification function a plurality of test digital signatures for verification.

5. The method of claim 1 in which the application program tests the signature verification function of the operating system by presenting to the signature verification function a plurality of test digital signatures in a specified pattern of true and false signatures for verification.

6. In an information handling system in which an application program runs on an operating system having a signature verification function for verifying a digital signature of the application program, apparatus for program verification comprising:

a signature verification function associated with the operating system for verifying the digital signature of the application program and, responsive to verification of the digital signature of the application, initiating execution of the application program; and a verification testing function associated with the application program, responsive to initiation of execution of the application program, for testing the signature verification function of the operating system by presenting to the signature verification function a test digital signature for verification.

7. The apparatus of claim 6 in which the application program initiates normal execution in response to a successful test of the signature verification function of the operating system by the verification testing function and terminates execution in response to an unsuccessful test of the signature verification function of the operating system by the verification testing function.

8. The apparatus of claim 6 in which the verification testing function of the application program tests the signature verification function of the operating system by presenting to the signature verification function a plurality of test digital signatures for verification.

9. The apparatus of claim 6 in which the verification testing function of the application program tests the signature verification function of the operating system by presenting to the signature verification function a plurality of test digital signatures in a specified pattern of true and false signatures for verification.

10. A program storage device readable by a machine, tangibly embodying a program of instructions executable by the machine to perform method steps for program verification in an information handling system in which an application program runs on an operating system having a signature verification function for verifying a digital signature of the application program, the method steps comprising:

having the signature verification function of the operating system verify the digital signature of the application program and, responsive to verification of the digital signature of the application program, initiate execution of the application program; and having the application program, responsive to initiation of execution thereof, test the signature verification function of the operating system by presenting to the signature verification function a test digital signature for verification.

11. The program storage device of claim 10 in which the application program initiates normal execution in response to a successful test of the signature verification function of the operating system.

12. The program storage device of claim 10 in which the application program terminates execution in response to an unsuccessful test of the signature verification function of the operating system.

13. The program storage device of claim 10 in which the application program tests the signature verification function of the operating system by presenting to the signature verification function a plurality of test digital signatures for verification.

14. The program storage device of claim 10 in which the application program tests the signature verification function of the operating system by presenting to the signature verification function a plurality of test digital signatures in a specified pattern of true and false signatures for verification.

15. The method of claim 1 in which the digital signature of the application program is generated using a private key having a corresponding public key and in which the signature verification function of the operating system verifies the digital signature of the application program using the public key corresponding to the private key.

16. The method of claim 1 in which the signature verification function of the operating system generates a verification result for the test digital signature presented to it by the application program and in which the application program analyzes the verification result to test the signature verification function.

17. The apparatus of claim 6 in which the digital signature of the application program is generated using a private key having a corresponding public key and in which the signature verification function of the operating system verifies the digital signature of the application program using the public key corresponding to the private key.

18. The apparatus of claim 6 in which the signature verification function of the operating system generates a verification result for the test digital signature presented to it by the application program and in which the verification testing function analyzes the verification result to test the signature verification function.

19. The program storage device of claim 10 in which the digital signature of the application program is generated using a private key having a corresponding public key and in which the signature verification function of the operating system verifies the digital signature of the application program using the public key corresponding to the private key.

20. The program storage device of claim 10 in which the signature verification function of the operating system generates a verification result for the test digital signature presented to it by the application program and in which the application program analyzes the verification result to test the signature verification function.

* * * * *